(12) United States Patent
Hale et al.

(10) Patent No.: US 11,448,561 B2
(45) Date of Patent: Sep. 20, 2022

(54) OVERLOAD INHIBITING TORQUE METER

(71) Applicant: Bell Helicopter Textron Inc., Fort Worth, TX (US)

(72) Inventors: Rodney Keith Hale, Joshua, TX (US); Ron L. Woods, Weatherford, TX (US)

(73) Assignee: Textron Innovations Inc., Providence, RI (US)

( * ) Notice: Subject to any disclaimer, the term of this patent is extended or adjusted under 35 U.S.C. 154(b) by 788 days.

(21) Appl. No.: 16/375,974

(22) Filed: Apr. 5, 2019

(65) Prior Publication Data

US 2020/0319042 A1 Oct. 8, 2020

(51) Int. Cl.
*G01L 3/10* (2006.01)
*F16D 1/12* (2006.01)
*B64C 27/12* (2006.01)

(52) U.S. Cl.
CPC .............. *G01L 3/104* (2013.01); *B64C 27/12* (2013.01); *F16D 1/12* (2013.01); *F16D 2300/18* (2013.01)

(58) Field of Classification Search
CPC ......... G01L 3/104; B64C 27/12; B64C 27/14; B25F 5/001; F16D 7/10; F16D 1/12; F16D 2300/18
USPC .................................................. 73/862.325
See application file for complete search history.

(56) References Cited

U.S. PATENT DOCUMENTS

| | | | | |
|---|---|---|---|---|
| 2,476,894 | A * | 7/1949 | Mulheim | F16D 3/14 464/17 |
| 3,141,313 | A * | 7/1964 | Brickett | F16D 3/72 464/157 |
| 3,791,169 | A * | 2/1974 | Wright | F16F 15/10 464/24 |
| 4,187,698 | A * | 2/1980 | Ohlson | F16D 3/18 464/157 |
| 2017/0036691 | A1 * | 2/2017 | Kikuchi | F16D 3/68 |
| 2019/0368954 | A1 * | 12/2019 | Atkins | B64C 27/12 |

FOREIGN PATENT DOCUMENTS

| | | | | |
|---|---|---|---|---|
| ES | 2653849 T3 | * | 2/2018 | ............. E21B 25/16 |
| GB | 1484082 A | * | 8/1977 | ............. F16D 3/185 |
| JP | 2020090983 A | * | 6/2020 | |

\* cited by examiner

*Primary Examiner* — Octavia Davis Hollington
(74) *Attorney, Agent, or Firm* — Fogarty LLP

(57) ABSTRACT

Embodiments are directed to a drive shaft apparatus comprising a first rotary member and a second rotary member arranged coaxially with said first rotary member. The rotary members are fixedly connected at a first end so that they rotate together. Each rotary member has a set of elements spaced apart around its circumference at a second end. The elements on the first rotary member are spaced apart from the elements on the second rotary member at rest. The first rotary member undergoes torsion when a load is applied during rotation, which causes the first rotary member elements to move closer to the second rotary member elements. The first elements engage the second elements when a torque load less than a yield torque is applied to the first rotary member, which transfers at least a portion of the torque load to the second rotary member.

16 Claims, 4 Drawing Sheets

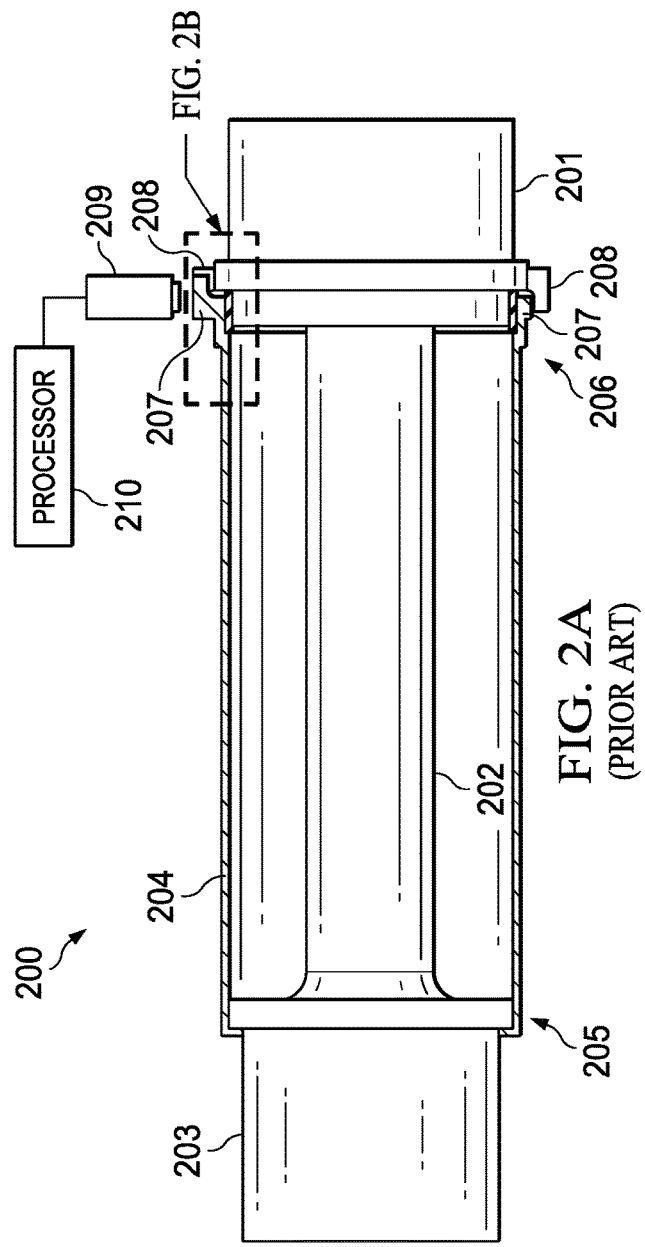
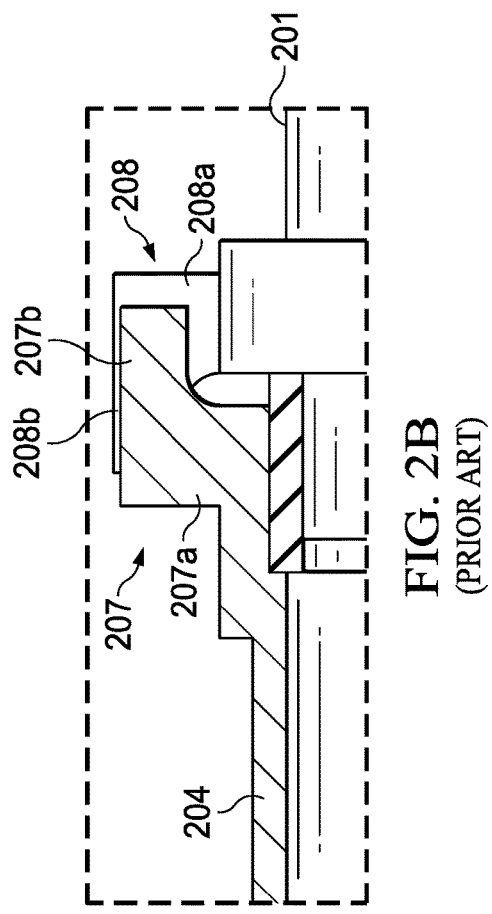
FIG. 2A (PRIOR ART)
FIG. 2B (PRIOR ART)

ABSTRACT# OVERLOAD INHIBITING TORQUE METER

GOVERNMENT RIGHTS

This invention was made with Government support under Contract No. N00019-09-D-0008 DO 0014 awarded by the Department of the Navy. The Government has certain rights in this invention.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system. A rotor system may include one or more pitch links to rotate, deflect, and/or adjust rotor blades and a power source, such as an engine and transmission, to drive the rotor system. The engine and transmission may be coupled by a drive shaft. Torque loads on the drive shaft may be measured to monitor operating conditions.

SUMMARY

In one aspect, embodiments are directed to a drive shaft apparatus comprising a first rotary member having a first set of elements spaced apart around its circumference at a first end, and a second rotary member arranged coaxially with said first rotary member and having a second set of elements spaced apart around its circumference at a first end. The elements in the second set are spaced apart from the elements in the first set when the first and second rotary members are at rest. A second end of the first rotary member fixedly connected to a second end of the second rotary member so that they rotate together. The first rotary member is configured to undergo torsion when a load is applied during rotation. The torsion causes the first set of elements to move closer to the second set of elements. The first set of elements are configured to engage the second set of elements when a torque load less than a yield torque is applied to the first rotary member. The second rotary member is configured to carry at least a portion of the torque load after the first set and second set of elements are engaged.

BRIEF DESCRIPTION OF THE DRAWINGS

Figure 1:
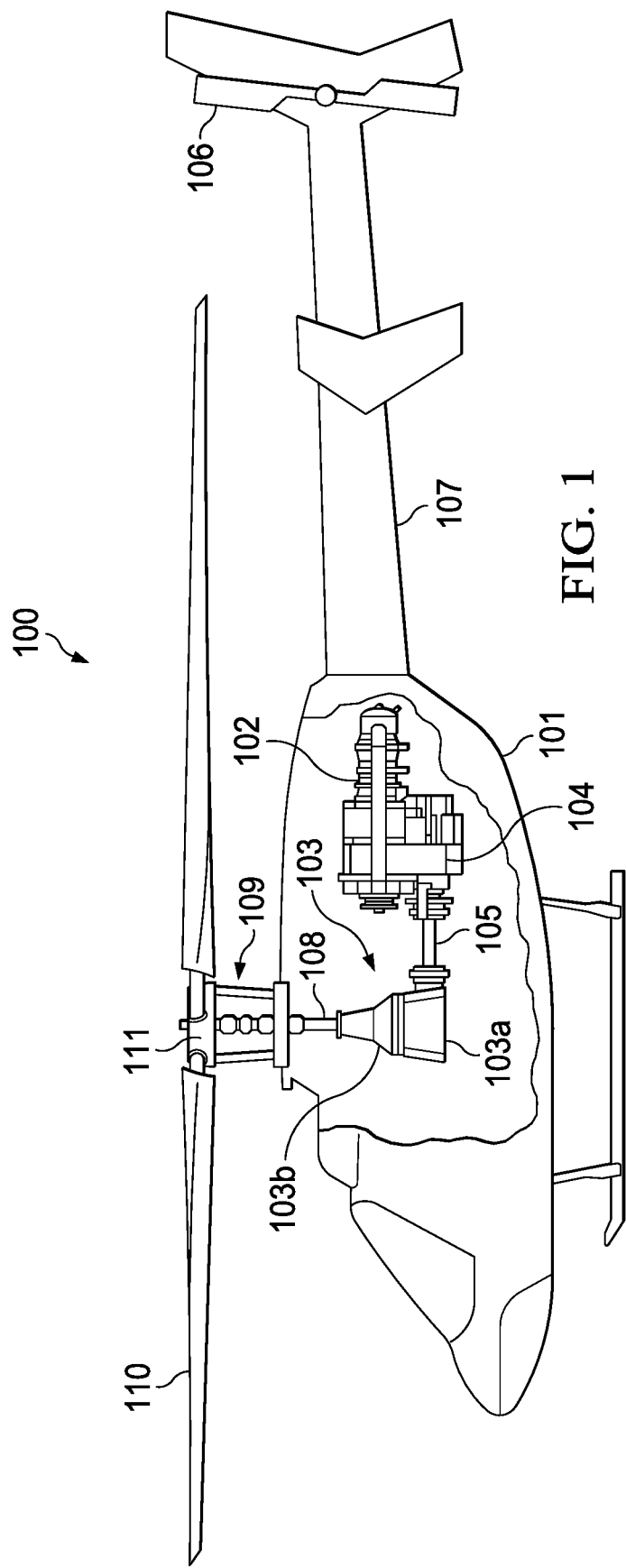

Having thus described the invention in general terms, reference will now be made to the accompanying drawings, which are not necessarily drawn to scale, and wherein:

FIG. 1 illustrates a helicopter with a main rotor gearbox and rotor assembly capable of employing embodiments of the disclosed torque meter system.

FIG. 2A illustrates components of an interlaced teeth torque meter according to example embodiments.

FIG. 2B is a detailed illustration of witness tube teeth and engine output shaft teeth according to a prior embodiment.

Figure 3A:
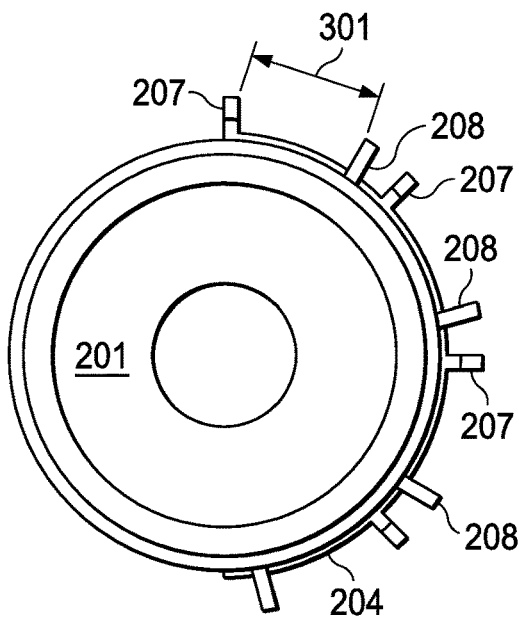
Figure 3B:
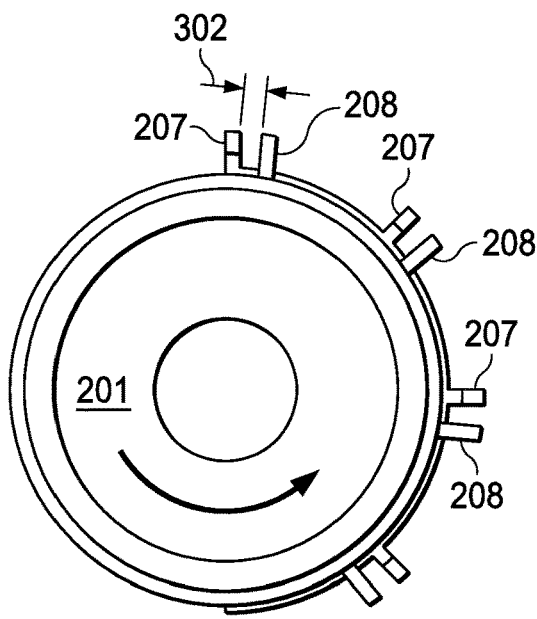
Figure 3C:
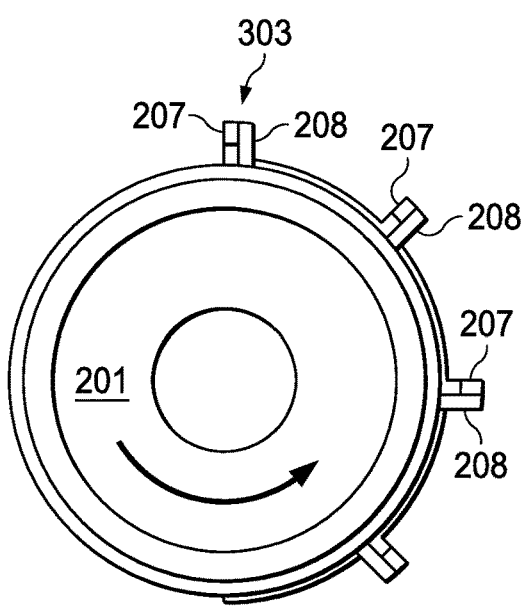

FIGS. 3A-C depict the spacing of the witness tube teeth and engine output shaft teeth at various torque loads.

Figure 4A:
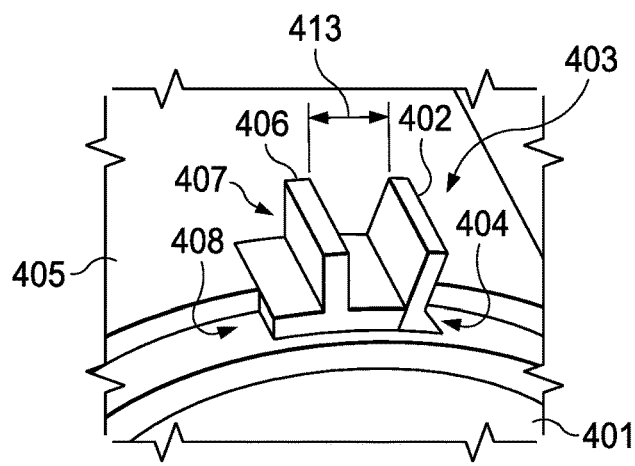
Figure 4B:
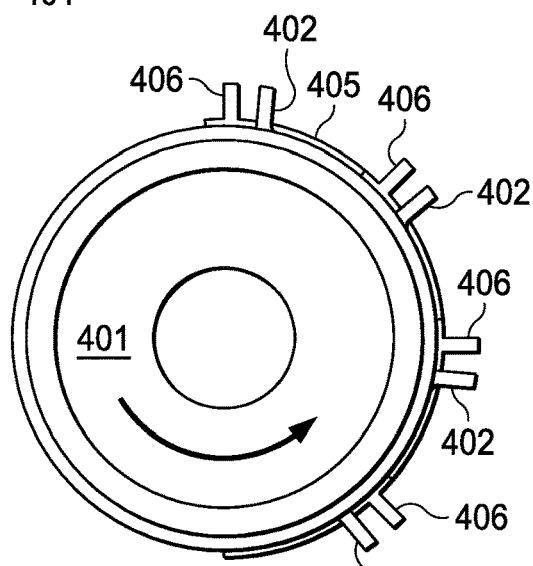
Figure 4C:
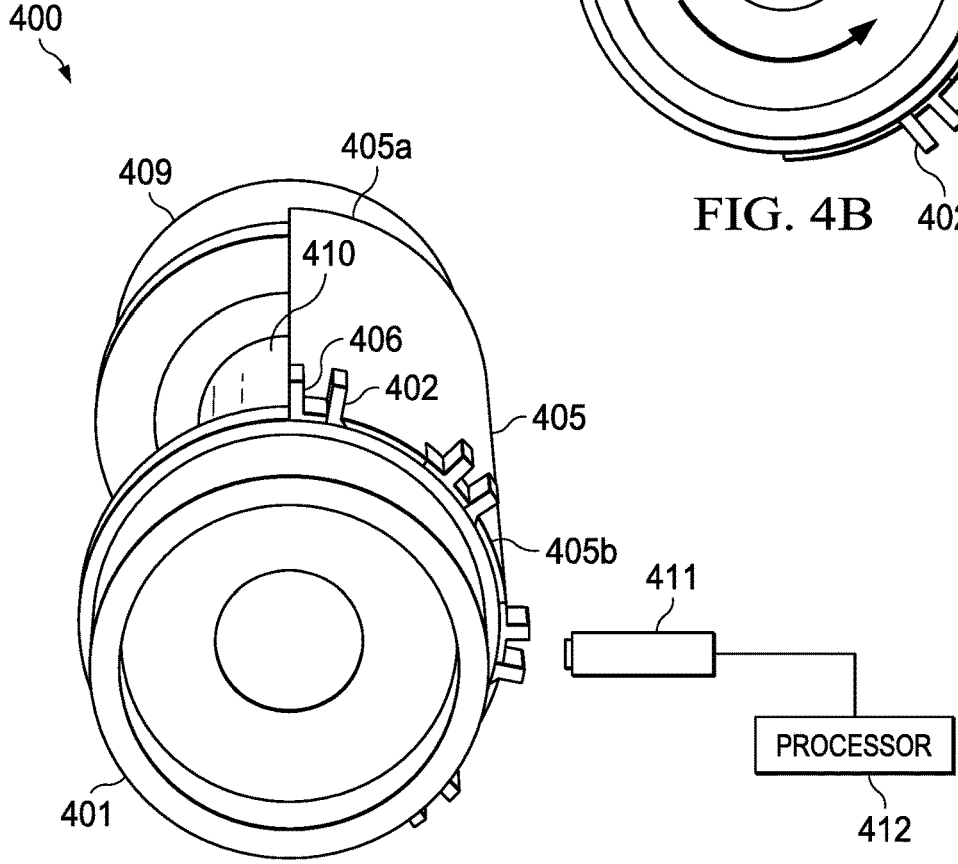

FIGS. 4A-C depict an overload-inhibiting torque meter having reinforced teeth according to one embodiment.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

FIG. 1. illustrates a helicopter 100 comprising a fuselage 101, an engine 102, a main rotor gearbox (MRGB) 103 that is mechanically coupled to the engine 102 through a reduction gearbox 104. Reduction gearbox 104 has a drive-shaft 105 powering MRGB 103. A tail rotor 106 functions as an anti-torque system mounted on tail member 107. Reduction gearbox 104 has attachment points for the engine accessories, such a starter-generator, a fuel pump, tachometers, etc. A mast 108 mechanically couples MRGB 103 to rotor system 109. The rotor system 109 comprises rotor blades 110 that are coupled to mast 108 via a hub 111. Engine 102 supplies torque to main rotor mast 101 via MRGB 103 to rotate main rotor blades 110. Engine 102 also supplies torque to a tail rotor drive shaft to rotate tail rotor 106.

Rotor blades 110 provide lift to enable flight for helicopter 100. The rotor blades 110 are controlled by multiple controllers within fuselage 101. The pitch of each rotor blade 109 can be manipulated to selectively control direction, thrust, and lift of the helicopter 100. For example, during flight a pilot can manipulate a cyclic controller to change the pitch angle of rotor blades 110 and/or manipulate pedals to provide vertical, horizontal, and yaw flight movement. Further, the pitch of tail rotor 106 blades can be selectively controlled to selectively control yaw of helicopter 100.

Engine 102 comprises two turbine sections, a gas producer turbine (Ng) and a power turbine (N2). The compressor is directly driven by Ng, while N2 drives the engine power-takeoff gear shaft through a reduction gear train. The main power and accessory drive gear trains are enclosed in the reduction gearbox 104. The reduction gearbox 104 is connected to engine 102 and all engine components, including the compressor, the turbine, and engine accessories are attached to the gearbox 104 case. In one embodiment, a two-stage helical and spur gear set is used to reduce rotational speed at the N2 drive (approximately 33,000 RPM for a Rolls-Royce 250 engine, for example) to the output drive spline (approximately 6,000 RPM). When engine 102 is powering the rotors 110, the N2 RPM and hence rotor RPM, may be kept constant by the action of an N2 governor. The N2 governor will cause a fuel control unit to alter fuel flow to vary the Ng RPM to suit changing power (torque) requirements.

The N2 gear train and turbine are not mechanically tied to the Ng gear assembly. The N2 turbine is turned by the energy of the expanding hot gas delivered to it by the Ng gear train. The purpose of the N2 gear train is to convert the kinetic energy produced by the motion of the N2 rotor to usable shaft horse power to sustain helicopter flight. MRGB 103 functions to convert high speed rotation of output drive shaft 105 of engine 102 into lower speed rotation of main rotor mast 108. MRGB 103 may include a plurality of gears and bearings within an upper case 103a and a lower case 103b.

A torque meter, such as an interlaced teeth torque meter, may be used to monitor the torque applied to drive shaft 105. In one embodiment, the torque carrying capacity of an interlaced teeth torque meter is increased without compromising the accuracy of the reported torque. The torque meter's witness tube may be used to absorb a significant amount of the torque load as the torque shaft approaches an overload condition. Existing interlaced teeth torque meters do not use the witness tube to share torque load in order to inhibit yielding, or maybe rupture, of the torque shaft. The roots of the teeth on both the torque shaft and the witness tube may be reinforced to inhibit overloading the torque shaft. By extending and strengthening the teeth roots on both the torque shaft and the witness tube, the teeth may come into contact before the torque shaft reaches its yield point. This contact then transfers at least a portion of the torque load onto the witness tube. The witness tube may then support a portion of the torque load up until the point where the reinforced teeth fail or are sheared off.

It should be appreciated that the embodiments disclosed in the present application may be used on aircraft other than helicopters, such as airplanes, tilt rotors, unmanned aircraft, to name a few examples. Further, the embodiments of the present application may be used on non-aircraft vehicles and implementations.

FIG. 2A illustrates components of an interlaced teeth torque meter 200 according to example embodiments. Engine output shaft 201 is coupled to torque shaft 202, which transfers power through rotation to an input pinion 203 of a main rotor gearbox. A witness tube 204 is fixedly attached to the gearbox end 205 of drive shaft 202. Witness tube 204 rotates with, and at the same speed as, gearbox input pinion 203. Witness tube 204 also has a free end 206 near engine output shaft 201. Free end 206 is not attached to engine output shaft 201 and, therefore, torque shaft 202 rotates freely within witness tube 204 at end 206. One or more teeth 207 are formed on the free end 206 of witness tube 204. A corresponding number of teeth 208 are formed on engine output shaft 201. Teeth 208 are spaced so that they are at a set angular displacement from teeth 207 when the engine is at rest or under no torque load.

The position of teeth 207 and 208 may be measured using a monopole or variable reluctance sensor 209. Monopole 209 generates a magnetic field. Teeth 207 and 208 are a ferromagnetic material. When one of the teeth 207 or 208 moves close to monopole 209, the magnetic flux of the monopole 209 changes, which creates a voltage signal or pulse that can be fed to a processor 210 or other circuitry. The voltage signal can be analyzed or processed to measure the how fast the pulses are occurring, which corresponds to the rotational speed or angular velocity of engine output shaft 201, drive shaft 202, and gearbox input pinion 203. The voltage signal can be analyzed or processed to measure the time between the pulses, which corresponds to the angular displacement (i.e., gap) between teeth 207 and 208. As the angular displacement between teeth 207 and 208 is reduced, the time between pulses is also reduced. This change in angular displacement indicates that drive shaft 202 is twisting so that witness tube 204 (and gearbox input pinion 203) is moving angularly relative to engine output shaft 201. The gap between teeth 207 and 208 may be calibrated to torque in drive shaft 202. This would allow processor 210 to determine the gap between teeth at any time and then create an output indicating the current torque load on drive shaft 202. This may be displayed on an instrument panel, for example.

During operation, rotation of engine output shaft 201 causes drive shaft 202 to rotate, which in turn causes gearbox input pinion 203 to rotate. The main rotor gearbox applies a load to drive shaft 202 that is based upon the load required by the rotor system. Under low load conditions, engine output shaft 201, drive shaft 202, and input pinion 203 all rotate together and teeth 207 and 208 maintain the same initial angular displacement. As the gearbox load increases, drive shaft 202 may twist as the rotation of gearbox input pinion 203 begins to lag behind the rotation of engine output shaft 201. This twisting may be observed by a change in the angular displacement of teeth 207 and 208. Since witness tube 204 rotates with input pinion 203, the angular displacement of teeth 207 and 208 will be reduced as drive shaft 202 twists.

Drive shaft 202 is designed to accept a certain amount of torque and twisting; however, once the twisting continues in an overloading situation, the twisting will typically increase as the load further increases. Drive shaft 202 has a yield point at which excessive twisting will cause permanent deformation (e.g., maintain a permanent degree of twist under any load conditions) and may eventually cause a failure (e.g., crack or break). This deformation will occur at or above a yield torque, which is the point at which the drive shaft has been twisted beyond its elastic limits thereby causing permanent deflection.

Prior to reaching the yield point, if the gearbox load is decreased, then drive shaft 202 will untwist so that the angular displacement of teeth 207 and 208 returns to the initial value. If the yield point has been reached, then drive shaft 202 will not untwist back to the initial value. Because of the deformation to drive shaft 202, the angular displacement of teeth 207 and 208 will not return to the initial value when the gearbox load is reduced. As a result, even though drive shaft 202 has not failed, the deformation will cause the angular displacement of teeth 207 and 208 to register as a twist in drive shaft 202.

FIG. 2B is a detailed illustration of witness tube teeth 207 and engine output shaft teeth 208 according to a prior embodiment. Each tooth has a wide upper portion and is attached to a rotating body by a root portion. Teeth 207 have a narrow root portion 207a attached to witness tube 204, and teeth 208 have a narrow root portion 208a attached to engine output shaft 201. Teeth 207 and 208 have wide upper section 207a and 208a, respectively, that overlap when viewed from the side. These wider sections 207*a* and 208*a* provide a larger surface to be detected by monopole 209. A problem with the existing design is that teeth 207 and 208 can easily be bent out of position or knocked off due to the narrow root portion.

FIGS. 3A-C depict the spacing of the witness tube teeth 207 and engine output shaft teeth 208 at various torque loads. In FIG. 3A, zero torque is applied to the drive shaft. There is a large gap 301 between the witness tube teeth 207 and engine output shaft teeth 208 under the zero torque conditions. In FIG. 3B, the drive shaft is rotating counter-clockwise and torque is being applied to the drive shaft. As a result, the gap 302 between the teeth 207 and teeth 208 has reduced. This occurs because of drive shaft twist. The gearbox end 205 of the drive shaft lags behind the engine output end 206. Since witness tube 204 rotates with the gearbox end, teeth 207 reflect the current position of the gearbox end of the drive shaft. As the torque increases, gap 302 closes from the initial distance 301 and teeth 207 and 208 will eventually touch 303 (i.e., no gap) under high torque as shown in FIG. 3C.

In some designs, the condition illustrated in FIG. 3C occurs when the drive shaft is above a yield torque. As a result, the drive shaft will be permanently deformed because the drive shaft has already yielded when teeth 207 and 208 come in contact. The drive shaft may be capable of carrying higher torque loads without a total failure, but such higher torque loads would cause teeth 207 and/or 208 to break (e.g., bend or shear off at root portion 207*a* or 208*a*) in existing systems.

In an embodiment, the witness tube may be configured to absorb at least some of the torque load when teeth 207 and 208 come in contact. Teeth 207 and 208 may be reinforced in order to allow them to accept high forces following contact. Additionally, teeth 207 and 208 may be positioned to come in contact before the drive shaft reaches a yield torque so that excess torque load is transferred to, or shared with, the witness tube.

FIGS. 4A-C depict an overload-inhibiting torque meter 400 having reinforced teeth according to one embodiment. An engine output shaft 401 has one or more teeth 402. The teeth 402 have an upper portion 403 adapted to be detected by a monopole, and a reinforced root portion 404 attached to the engine output shaft 401. A witness tube 405 has one or more teeth 406. The witness tube teeth 406 have an upper portion 407 adapted to be detected by a monopole, and a reinforced root portion 408 attached to witness tube 405.

Witness tube 405 is attached to, and rotates with, gearbox input pinion 409 at end 405*a*. The engine output shaft 401 rotates freely inside end 405*b* of witness tube 405. A drive shaft 410 couples the engine output shaft 401 to gearbox input pinion 409. As teeth 402 and 406 pass monopole 411, a voltage signal is generated and passed to processor 412, which analyzes the signal to determine the torque on drive shaft 410.

As illustrated in FIGS. 4A-C, torque has twisted drive shaft 410 so that teeth 402 have reduced the gap with teeth 406. Root portion 408 of teeth 406 contact root portion 404 of teeth 402. The upper portions 406 and 403 do not make contact in one embodiment. In other embodiments, root portion 408 of teeth 406 may be reinforced only on one side so that an entire side of a tooth 406 contacts the side of a tooth 402. Because the teeth in torque meter 400 are reinforced at the root, which is also where at least the initial contact occurs, the teeth will withstand higher forces than previous torque designs (e.g. FIG. 2B).

Witness tube 405 comprises a material, such as a metal alloy, that can absorb torque load in torque meter 400. Accordingly, when the reinforced root portions 404 and 408 of teeth 402 and 406 come into contact, then witness tube 405 is then being driven by engine output shaft 401 and assists drive shaft 410 in rotating gearbox input pinion 409. By adding witness tube 405 as a driving component, this slows or stops the torque load increase on drive shaft 410 because the torque load is distributed to witness tube 405. If the overall torque load continues to increase, then teeth 402 and/or 406 may eventually fail or sheer off; however, such an event will occur at a much higher torque than in prior designs.

In one embodiment, witness tube 405 and teeth 402 and 406 in torque meter 400 are configured to engage at a torque (i.e., a contact torque level) that is less than the yield torque of drive shaft 410. For example, a yield torque may be calculated for the material used for drive shaft 410. A contact torque may then be selected that is lower than the yield torque by a safety margin (e.g., 10% less than the yield torque). The teeth 402 and 406 may then be positioned on engine output shaft 401 and witness tube 405 so that the gap closes and allows them to touch at the contact torque.

Once teeth 402 and 406 come in contact, the torque meter will be unable to measure increased torque above the contact torque level since the gap between the teeth 402 and 406 will not decrease further (i.e., a minimum gap between the teeth). Accordingly, after contact occurs, monopole 411 will detect no further reduction in the gap 413 between teeth 402 and 406. Once this minimum gap is reached, processor 412 may generate an alert, such as a warning or caution light, for a pilot or other operator to notify them that the maximum torque detection limit has occurred.

In an example embodiment, a torque meter apparatus comprises a rotating member having a first end and a second end, and an indicating member overlying and spaced radially outward from the rotating member. A first end of the indicating member is fixedly attached to and rotating with the first end of the rotating member. A second end of the indicating member overlaps and rotates independently of the second end of the rotating member. A first set of protrusions are fixedly attached to the second end of the indicating member. A second set of protrusions are coupled to the second end of the rotating member and interlaced with the first set of protrusions. The first set and second set of protrusions are configured to be used for measuring a torque load on the rotating member. The first set and second set of protrusions are not in contact with each other when the rotating member is not operating under torque. The second set of protrusions are configured to engage the first set of protrusions when a torque load less than a yield torque is applied to the rotating member, and the indicating member is configured to support at least a portion of the torque load after the first set and second set of protrusions are engaged. The rotating member may be a drive shaft, and the indicating member may be a witness tube.

The torque meter apparatus may further comprise a sensor positioned adjacent the second end of the indicating member. The sensor is configured to measure a gap between the first set of protrusions and the second set of protrusions.

The first set of protrusions and the second set of protrusions on the torque meter apparatus may be configured to engage at a root portion. The first set of protrusions and the second set of protrusions may comprise an upper portion and the root portion. A gap may remain between the upper portions of adjacent protrusions when the root portions of the adjacent protrusions engage. The root portions of the first set of protrusions and the second set of protrusions may be configured to support forces that are greater than those generated when the yield torque is applied to the rotating member.

In an example embodiment, a torque meter comprises a drive shaft having a first end coupled to a power source and a second coupled to a load. A witness tube overlies and is spaced radially outward from the drive shaft. A first end of the witness tube is fixedly attached to, and rotating with, the load end of the drive shaft. A second end of the witness tube overlaps and is rotating independently of the power source end of the drive shaft. The witness tube has a first set of teeth spaced around the second end, and the drive shaft has a second set of teeth interspaced between and apart from the first set of teeth when the drive shaft is not operating under torque. The first set of teeth and the second set of teeth are configured to be used for measuring a torque load on the drive shaft. The second set of teeth are configured to engage the first set of teeth when a torque load less than a yield torque is applied to the drive shaft, and the witness tube is configured to support at least a portion of the torque load after the first set and second set of teeth are engaged.

The torque meter may further comprise a sensor positioned adjacent to the first set and second set of teeth. The sensor may be configured to measure gaps between the first set of teeth and the second set of teeth.

The first set of teeth and the second set of teeth on the torque meter may be configured to engage at a root portion. The first set of teeth and the second set of teeth may comprise an upper portion and the root portion. A gap may remain between the upper portions of adjacent protrusions when the root portions of the adjacent teeth engage. The root portions of the first set of teeth and the second set of teeth may be configured to support forces that are greater than those generated when the yield torque is applied to the drive shaft.

In an example embodiment, a drive shaft apparatus comprises a first rotary member having a first set of elements spaced apart around its circumference at a first end, and a second rotary member arranged coaxially with said first rotary member. The second rotary member having a second set of elements spaced apart around its circumference at a first end. The elements in the second set spaced apart from the elements in the first set when the first and second rotary members are at rest. A second end of the first rotary member fixedly connected to a second end of the second rotary member. The first rotary member is configured to undergo torsion when a load is applied during rotation, the torsion causing the first set of elements to move closer to the second set of elements. The first set of elements are configured to engage the second set of elements when a torque load less than a yield torque is applied to the first rotary member. The second rotary member is configured to carry at least a portion of the torque load after the first set and second set of elements are engaged. The first rotating member may be a drive shaft and the second rotating member may be a witness tube.

The drive shaft apparatus may further comprise a sensor positioned adjacent the first set and second set of elements. The sensor configured to measure a gap between the first set of elements and the second set of elements.

The first set of elements and the second set of elements on the drive shaft apparatus may be teeth that are configured to engage at a root portion. The first set of elements and the second set of elements may comprise an upper portion and the root portion. A gap may remain between the upper portions of adjacent protrusions when the root portions of the adjacent protrusions engage. The root portions of the first set of elements and the second set of elements may be configured to support forces that are greater than those generated when the yield torque is applied to the rotating member.

A torque capacity of the first rotary member in the drive shaft apparatus is increased when the first set of elements engage the second set of elements due to sharing of the torque load with the second rotary member. The increased torque capacity of the first rotary member provides a significant increase in a safety margin over a complete loss of torque of the drive shaft apparatus.

The apparatus disclosed herein will withstand significantly higher loads before rupture of the drive shaft thereby providing an improvement in safety for a complete shaft failure. The ultimate torque capacity of the first rotary member is greatly increased due to the sharing of torque with the second rotary member, thus providing a significant increase in the margin of safety over complete loss of torque of the drive shaft apparatus.

Although the example embodiments illustrated herein show the witness tube attached to the gearbox end of the drive shaft, it will be understood that in other embodiments the witness tube may be attached to an engine output and may rotate freely at a gearbox end. Furthermore, any appropriate number of teeth may be used in the torque meter depending upon the degree of twist expected in the drive shaft. Moreover, it will be understood that the overload-inhibiting torque meter disclosed herein is not limited to use in a rotorcraft drive shaft but may be used in any application wherein preventing a drive shaft from reaching a yield torque is beneficial or advantageous. Additionally, it will be understood that systems for measuring the gap between teeth are not limited to a monopole but that any device or sensor capable of measuring a gap or interval between teeth may be used in the torque sensor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:
1. A torque meter apparatus, comprising:
a rotating member having a first end and a second end;
an indicating member overlying and spaced radially outward from the rotating member, a first end of the indicating member fixedly attached to and rotating with the first end of the rotating member, and a second end of the indicating member overlapping and rotating independently of the second end of the rotating member;

a first set of protrusions fixedly attached to the second end of the indicating member, a second set of protrusions coupled to the second end of the rotating member and interlaced with the first set of protrusions, wherein the first set and second set of protrusions are configured to be used for measuring a torque load on the rotating member, the first set and second set of protrusions not in contact with each other when the rotating member is not operating under torque; and a sensor positioned adjacent the second end of the indicating member, the sensor configured to measure a gap between the first set of protrusions and the second set of protrusions;

wherein the second set of protrusions are configured to engage the first set of protrusions when a torque load less than a yield torque is applied to the rotating member, and wherein the indicating member is configured to support at least a portion of the torque load after the first set and second set of protrusions are engaged.

2. The torque meter of claim 1, wherein the rotating member is a drive shaft and the indicating member is a witness tube.

3. The torque meter of claim 1, wherein the first set of protrusions and the second set of protrusions are configured to engage at a root portion.

4. The torque meter of claim 3, wherein the first set of protrusions and the second set of protrusions comprise an upper portion and the root portion, and wherein a gap remains between the upper portions of adjacent protrusions when the root portions of the adjacent protrusions engage.

5. The torque meter of claim 3, wherein the root portions of the first set of protrusions and the second set of protrusions are configured to support forces that are greater than those generated when the yield torque is applied to the rotating member.

6. A torque meter, comprising:
a drive shaft having a first end coupled to a power source and a second coupled to a load;
a witness tube overlying and spaced radially outward from the drive shaft, a first end of the witness tube fixedly attached to and rotating with the load end of the drive shaft, and a second end of the witness tube overlapping and rotating independently of the power source end of the drive shaft; and
a sensor positioned adjacent to the first set and second set of teeth, the sensor configured to measure gaps between the first set of teeth and the second set of teeth;
wherein the witness tube has a first set of teeth spaced around the second end and the drive shaft has a second set of teeth interspaced between and apart from the first set of teeth when the drive shaft is not operating under torque, the first set of teeth and the second set of teeth configured to be used for measuring a torque load on the drive shaft; and
wherein the second set of teeth are configured to engage the first set of teeth when a torque load less than a yield torque is applied to the drive shaft, and wherein the witness tube is configured to support at least a portion of the torque load after the first set and second set of teeth are engaged.

7. The torque meter of claim 6, wherein the first set of teeth and the second set of teeth are configured to engage at a root portion.

8. The torque meter of claim 7, wherein the first set of teeth and the second set of teeth comprise an upper portion and the root portion, and wherein a gap remains between the upper portions of adjacent protrusions when the root portions of the adjacent teeth engage.

9. The torque meter of claim 7, wherein the root portions of the first set of teeth and the second set of teeth are configured to support forces that are greater than those generated when the yield torque is applied to the drive shaft.

10. A drive shaft apparatus, comprising:
a first rotary member having a first set of elements spaced apart around its circumference at a first end;
a second rotary member arranged coaxially with said first rotary member, the second rotary member having a second set of elements spaced apart around its circumference at a first end, the elements in the second set spaced apart from the elements in the first set when the first and second rotary members are at rest, a second end of the first rotary member fixedly connected to a second end of the second rotary member; and
a sensor positioned adjacent the first set and second set of elements, the sensor configured to measure a gap between the first set of elements and the second set of elements;
wherein the first rotary member is configured to undergo torsion when a load is applied during rotation, the torsion causing the first set of elements to move closer to the second set of elements; and
wherein the first set of elements are configured to engage the second set of elements when a torque load less than a yield torque is applied to the first rotary member, and wherein the second rotary member is configured to carry at least a portion of the torque load after the first set and second set of elements are engaged.

11. The drive shaft apparatus of claim 10, wherein the first rotating member is a drive shaft and the second rotating member is a witness tube.

12. The drive shaft apparatus of claim 10, wherein the first set of elements and the second set of elements are teeth that are configured to engage at a root portion.

13. The drive shaft apparatus of claim 12, wherein the first set of elements and the second set of elements comprise an upper portion and the root portion, and wherein a gap remains between the upper portions of adjacent protrusions when the root portions of the adjacent protrusions engage.

14. The drive shaft apparatus of claim 12, wherein the root portions of the first set of elements and the second set of elements are configured to support forces that are greater than those generated when the yield torque is applied to the rotating member.

15. The drive shaft apparatus of claim 10, wherein a torque capacity of the first rotary member is increased when the first set of elements engage the second set of elements due to sharing of the torque load with the second rotary member.

16. The drive shaft apparatus of claim 15, wherein the increased torque capacity of the first rotary member provides a significant increase in a safety margin over a complete loss of torque of the drive shaft apparatus.

* * * * *